Oct. 23, 1951           D. WEIGHTON           2,572,788
FREQUENCY METER
Filed July 28, 1947
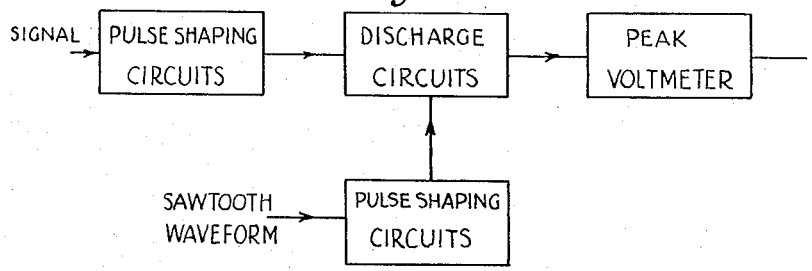
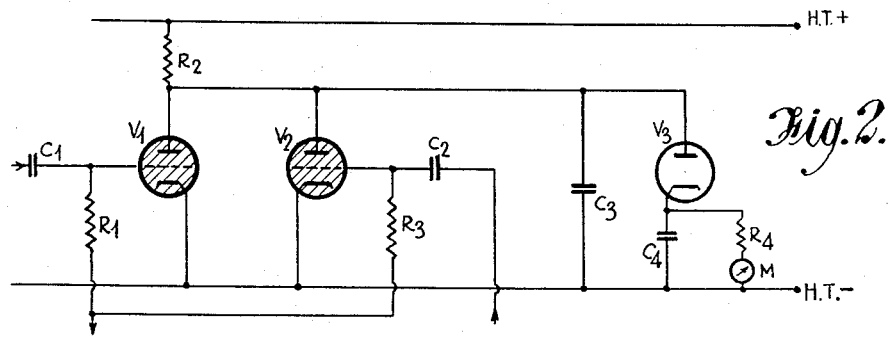
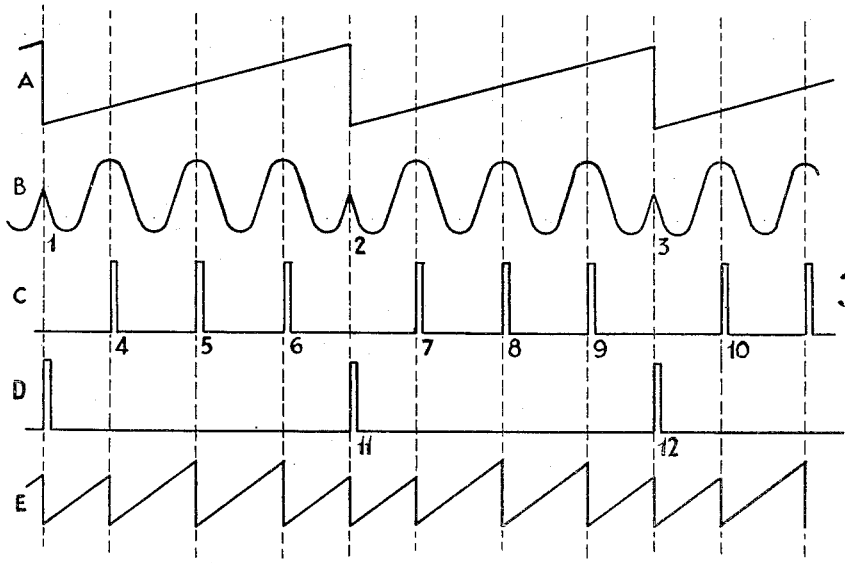
*Inventor*
DONALD WEIGHTON Patented Oct. 23, 1951

2,572,788

UNITED STATES PATENT OFFICE 2,572,788

FREQUENCY METER

Donald Weighton, Cambridge, England, assignor to Pye Limited, Cambridge, England, a British company Application July 28, 1947, Serial No. 764,169
In Great Britain September 9, 1940

Section 1, Public Law 690, August 8, 1946
Patent expires September 9, 1960

3 Claims. (Cl. 175—381)

The present invention relates to devices for indicating the frequency of electrical oscillations, and more particularly to frequency meters which may be used to give a continuous indication of frequency, not only when the said oscillations are continuous, but when they are interrupted by sudden changes of phase.

One application of the invention is its use in connection with apparatus for determining the distance of a body by means of a reflected radio wave.

It is known that the distance of a reflecting body may be determined by transmitting a radio wave which is frequency modulated in the form of a saw tooth, and producing in the receiver a beat note between the reflected and transmitted waves. The frequency of the beat note then indicates the distance of the reflecting body, but the note is interrupted by sudden changes of phase occurring at each fly back of the modulating saw tooth.

If such a wave, periodically interrupted by sudden changes of phase, is fed to a normal type of frequency meter, in which the condenser is charged and discharged on each cycle, the indication will be discontinuous, reading only multiples of the saw tooth repetition rate. The distance of the reflecting body cannot then be accurately determined unless the beat note is large compared with the repetition rate. Thus, a very large frequency excursion is required for the measurement of small distances, a condition which it is difficult to realize in practice. The present invention provides a frequency meter capable of continuous reading (provided that there are at least two cycles in each saw tooth period) whereby very small distances may be accurately measured with a relatively small frequency excursion of the radio transmitter.

From one aspect, the invention consists in a frequency meter wherein the electric oscillations of which the frequency is to be measured are fed to a limiting circuit which selects the peaks only of each cycle, which peaks are employed to discharge a capacity which is charged from a suitable source of potential during the time intervals occurring between successive peaks, and wherein the peak voltage acquired by the capacity during said time intervals is measured to give an indication of the time interval occurring between successive peaks and thus of the frequency of the oscillations.

The invention also consists in a frequency meter wherein the electric oscillations of which the frequency is to be measured are fed to a limiting circuit which selects the peaks only of each cycle, which peaks are applied to the grid of a thermionic valve to discharge a condenser connected across its anode circuit, said condenser being charged during the time intervals between successive peaks through a resistor connected to the source of anode potential, and wherein means are provided for measuring the peak voltage acquired by said capacity to indicate the time interval occurring between successive peaks and thus the frequency of the oscillations.

Preferably the pulse peaks are fed through a pulse shaping circuit or circuits before being employed to discharge the capacity or condenser. In the case where signals of the above-mentioned type which suffer periodic phase shift are to be measured, the capacity or condenser is also discharged at the end of each period.

The invention may be carried out in the following manner. The electrical oscillation is fed, after suitable amplification, to a limiting circuit which selects the peaks only of each cycle, and these are then further sharpened in successive shaping circuits to form positive pulses of short duration. These pulses are then applied to the grid of a thermionic valve to discharge a condenser connected in its anode circuit. The condenser is charged through a resistor connected to a source of high potential and is also periodically discharged by a further thermionic valve, which is fed with pulses derived from differentiation of the modulating saw tooth.

The peak potential across the condenser is determined by the longest time interval occurring between the successive pulses (i. e. by the frequency of the oscillation), and this is indicated on a high impedance peak voltmeter connected across the condenser. The peak voltmeter may be calibrated in cycles per second, or, as in the application referred to above, may be made to read directly the distance of the reflecting body.

In order that the invention may be more clearly understood, reference will now be made, by way of example, to the accompanying drawings, in which:

Fig. 1 shows the general arrangement of an apparatus according to the invention, Fig. 2 shows a circuit diagram and Fig. 3 shows a waveform diagram.

The incoming signal is fed to a pulse shaping circuit of the peak selecting type, whereby a wave form consisting of sharp pulses is obtained, one pulse occurring for each cycle of the input signal. These pulses are then fed to a discharge circuit comprising a condenser, the peak voltage across which is determined by the longest time interval occurring between the successive pulses, which peak potential is indicated on a peak voltmeter.

A particular embodiment of the discharge and peak voltmeter circuits is shown in greater detail in Fig. 2. The sharp pulses from the pulse shaping circuit are applied in positive sense to the grid of a gas-filled relay tube $V_1$ through the condenser $C_1$. This grid is negatively biassed through the resistor $R_1$, so that the relay is only caused to conduct by the peaks of each pulse. When the relay tube $V_1$ conducts, the condenser $C_3$, which is charged from a source of high potential through the resistor $R_2$, discharges through the relay. In the interval between pulses, the condenser $C_3$ again charges from the source of high potential through the resistor $R_2$, and the peak voltage acquired by the condenser $C_3$ therefore depends upon the interval between successive pulses, that is, on the frequency of the signal. This peak voltage is measured on a peak voltmeter of conventional design, consisting of the diode $V_3$, the condenser $C_4$, the resistor $R_4$, and the galvanometer M.

An important feature of the invention consists in the operation of the frequency meter on a signal which suffers periodic phase shifts of any angle, provided at least two complete cycles occur in the interval between successive phase shifts. When measuring the freqeuncy of the beat note in apparatus for determining the distance of a body by means of a reflected radio wave as above described, these phase shifts occur at the end of each frequency sweep of the transmitter. For operating on a signal of this nature, a further gas-filled relay tube $V_2$ is provided. The grid of this tube is negatively biassed through the resistor $R_3$, and pulses derived from the saw tooth modulation are fed to the grid through the condenser $C_2$, so that the condenser $C_3$ is also discharged through $V_2$ at the end of each period, in addition to discharging through $V_1$ on each pulse. This ensures that the condenser $C_3$ is not allowed to charge for a period longer than the interval between cycles of the incoming signal, but may be discharged after a shorter interval at the end of each sawtooth period. Provided that the time constant of the resistor $R_4$ and the condenser $C_4$ is sufficiently long, this will not affect the reading of the peak voltmeter.

The wave forms occurring at various points in the circuit are shown in Fig. 3. The curve shown at B represents an oscillation which is periodically interrupted in phase, the sudden changes of phase occurring at the points 1, 2, 3, etc. As above described, the invention permits the measurement of the frequency of an oscillation of this kind in spite of the fact that the sudden changes of phase would cause an erroneous indication on a frequency meter of conventional design. The peaks of the oscillation are clipped off and formed into a wave form of sharp pulses as shown at C. This wave form is that applied to the condenser $C_1$ in Fig. 2. In the absence of the tube $V_2$ the tube $V_1$, resistor $R_2$ and condenser $C_3$ operate as a time or frequency measuring circuit in a well-known manner. The condenser $C_3$ charges from the high tension supply via the resistor $R_2$ and is discharged at intervals by the tube $V_1$ which is opened at intervals by the pulses shown at C in Fig. 3. The maximum potential reached by the anode of $V_1$ depends on the interval between the pulses, and by measuring this maximum potential by means of the peak voltmeter $V_3$, $R_4$, $C_4$ and M, an indication is obtained of the frequency of the oscillation. However, in the presence of sudden changes of phase the circuit thus far described (i. e., in the absence of the tube $V_2$) would fail to indicate the true frequency of the oscillation. As shown in Fig. 3, the time intervals between the pulses 4 and 5 and between 5 and 6 correspond to the time of one cycle of the oscillation. At the point of phase change, however, there can occur intervals between pulses longer than that corresponding to the oscillation to be measured, such as, for example, between the pulses 6 and 7 and 9 and 10. During these intervals the condenser $C_3$ of the timing circuit in Fig. 2 would charge up to a higher potential than that acquired during the intervals between the pulses 4, 5 and 6, and the voltmeter circuit $V_3$, $C_4$ and $R_4$ would read this higher voltage instead of the true one. The present invention avoids this by the use of the tube $V_2$ which is connected in parallel with the tube $V_1$ and discharges the condenser $C_3$ each time a sudden change in phase occurs. This is achieved by supplying to the grid of the tube $V_2$ the pulses 11, 12, etc. shown at D in Fig. 3, these pulses being derived from a sawtooth wave form shown at A. In this case, as shown at E in Fig. 3, the condenser $C_3$ of Fig. 2 charges during the interval between pulses 6 and 11 and between 11 and 7, and similarly between pulses 9 and 12 and between 12 and 10, to a potential less than that acquired between the normal pulses 4, 5, 6, etc. The peak voltmeter circuit is therefore not disturbed by the potentials built up during the former intervals and responds only to the latter representing the true frequency of the oscillation.

In the example cited in the forgoing, the frequency meter is used to measure the beat produced between the reflected and transmitted wave of a frequency modulated distance measuring equipment. In this case, the sawtooth wave form with which the transmitter is modulated in frequency is available at the equipment and may be used to generate the pulses shown at D in Fig. 3.

Although a particular embodiment according to the invention has been described, it will be understood that various modifications may be made without departing from the scope of the invention as defined by the appended claims.

I claim:

1. Measuring apparatus responsive to electrical oscillations of a type suffering periodic phase shift, comprising a grid-controlled relay tube, means for normally biassing the grid of said tube to cut-off, a timing condenser in the anode circuit of said tube, means for charging said condenser from a source of constant potential, means for shaping incoming oscillations to a peak pulse waveform having one pulse per cycle of said oscillations, means for applying said waveform to said grid to cause said tube to become intermittently conducting and thereby discharge said condenser through said tube for the duration of each of said pulses impressed on said grid, said condenser charging from said source during intervals between successive pulses, a second grid-controlled relay tube, means for normal biasing the grid of said second tube to cut-off, said second tube having an anode circuit including said condenser, means for periodically impressing pulses on the grid of said second tube to cause said second tube to become intermittently conducting and thereby discharge said condenser through said second tube periodically at the end of each phase period, and means for measuring the peak voltages acquired by said condenser in the intervals between discharges.

2. Measuring apparatus responsive to a beat frequency of a type obtained by transmitting a radio wave which is frequency modulated in the form of a sawtooth, reflecting said wave and beating the transmitted and reflected waves, comprising a grid-controlled relay tube, means for normally biasing the grid of said tube to cut-off, a timing condenser in the anode circuit of said tube, means for charging said condenser from a source of constant potential, means for shaping incoming oscillations to a peak pulse waveform having one pulse per cycle of said oscillations, means for applying said waveform to said grid to cause said tube to become intermittently conducting and thereby discharge said condenser through said tube for the duration of each of said pulses impressed on said grid, said condenser charging from said source during intervals between successive pulses, a second grid-controlled relay tube, means for normal biassing the grid of said second tube to cut-off, said second tube having an anode circuit including said condenser, means for periodically impressing pulses derived from said sawtooth modulation on the grid of said second tube to cause said second tube to become intermittently conducting and thereby discharge said condenser through said second tube periodically at the end of each phase period, and means for measuring the peak voltages acquired by said condenser in the intervals between discharges.

3. Measuring apparatus responsive to a beat frequency of a type obtained by transmitting a radio wave which is frequency modulated in the form of a sawtooth, reflecting said wave and beating the transmitted and reflected waves comprising a grid-controlled relay tube, means for normally biassing the grid of said tube to cut-off, a timing condenser in the anode circuit of said tube, means for charging said condenser from a source of constant potential, means for shaping incoming oscillations to a peak pulse waveform having one pulse per cycle of said oscillations, means for applying said waveform to said grid to cause said tube to become intermittently conducting and thereby discharge said condenser through said tube for the duration of each of said pulses impressed on said grid, said condenser charging from said source during intervals between successive pulses, a second grid-controlled relay tube, means for normal biassing the grid of said second tube to cut-off, said second tube having an anode circuit including said condenser, shaping means for deriving by differentiation from the modulating sawtooth waveform a pulse waveform providing one pulse at the end of each sawtooth period, means for impressing said last-mentioned pulse waveform on the grid of said second tube to cause said second tube to become intermittently conducting and thereby discharge said condenser through said second tube periodically at the end of each sawtooth period, and means for measuring the peak voltages acquired by said condenser in the intervals between discharges.

DONALD WEIGHTON.

REFERENCES CITED

The following references are of record in the file of this patent:

UNITED STATES PATENTS

| Number | Name | Date |
|---|---|---|
| 2,021,766 | Bivens | Nov. 19, 1935 |
| 2,110,015 | Fitzgerald | Mar. 1, 1938 |
| 2,122,464 | Golay | July 5, 1938 |
| 2,137,859 | Schwartz et al. | Nov. 22, 1938 |
| 2,176,742 | LaPierre | Oct. 17, 1939 |
| 2,217,477 | Gulliksen | Oct. 8, 1940 |
| 2,228,367 | Sanders | June 14, 1941 |
| 2,301,195 | Bradford | Nov. 10, 1942 |
| 2,370,692 | Shepherd | Mar. 6, 1945 |
| 2,429,636 | McCoy | Oct. 28, 1947 |